United States Patent [19]

Ota et al.

[11] Patent Number: 4,653,342

[45] Date of Patent: Mar. 31, 1987

[54] SHIFT LEVER MECHANISM FOR A TRANSMISSION IN A VEHICLE

[75] Inventors: Shuji Ota, Okazaki; Toshihiro Nishio, Takahama, both of Japan

[73] Assignee: Kabushiki Kaisha Toyoda Jidoshokki Seisakusho, Kariya, Japan

[21] Appl. No.: 742,622

[22] Filed: Jun. 7, 1985

[30] Foreign Application Priority Data

Jun. 25, 1984 [JP] Japan .................. 59-95905[U]

[51] Int. Cl.$^4$ ..................... G05G 7/16; G05G 9/16
[52] U.S. Cl. ..................... 74/473 R; 74/745
[58] Field of Search ............ 74/473 R, 745; 180/336

[56] References Cited

U.S. PATENT DOCUMENTS

| | | | |
|---|---|---|---|
| 2,012,669 | 8/1935 | Lapsley | 74/473 R |
| 2,094,976 | 10/1937 | Bachman | 74/473 R |
| 2,352,301 | 6/1944 | Welles | 74/745 X |
| 3,489,028 | 1/1970 | Blavette | 74/473 |

FOREIGN PATENT DOCUMENTS

| | | | |
|---|---|---|---|
| 2641694 | 5/1977 | Fed. Rep. of Germany | 74/473 R |
| 736521 | 9/1955 | United Kingdom | 74/745 |

Primary Examiner—Allan D. Herrmann
Attorney, Agent, or Firm—Brooks Haidt Haffner & Delahunty

[57] ABSTRACT

The present invention relates to a shift lever mechanism for a transmission in a vehicle in which the driving mechanism is comprised of a differential case, a transmission case, a clutch housing and an engine which are connected respectively and characterized in that the first shifting fork shaft in the clutch is movably protruded through one wall portion of the transmission case, and connected to one end of a first connecting rod member, a first shift lever being connected to the other end portion of said first connecting rod member. The length of said rod member is greater than the lateral vibrational distance within the vehicle, so that the amount of vibration reaching the shift lever from the transmission is greatly reduced to improve ease of shifting and ensure a positive shift.

5 Claims, 8 Drawing Figures

SHIFT LEVER MECHANISM FOR A TRANSMISSION IN A VEHICLE

BACKGROUND OF THE INVENTION

This invention relates to a shift lever mechanism for a transmission in a vehicle such as an automobile, forklift truck and other vehicles for industrial use.

FIGS. 1 and 2 show a mounting portion of a shift lever mechanism for a transmission in a vehicle such as a forklift truck. A forward/reverse shift lever 1 and a speed change shift lever 2 are mounted so as to be tiltable through a pivot pin 4 in both front and rear directions on a transmission casing cover 3. The end portions of said shift levers 1 and 2 are connected with the shift forks 8 and 9 respectively cooperating with a forward-/reverse fork shaft 6 and a speed change fork shaft 7 which are slidably mounted to be movable both backwards and forwards in a transmission case 5.

A high and low speed change mechanism 11 and a forward/reverse selection mechanism 12 are mounted on a counter shaft 10 which is supported within said transmission case 5 at both front and rear ends thereof. A high speed gear 11a and low speed gear 11b are rotatably mounted on said counter shaft 10 opposite to each other in said high and low speed change mechanism 11, said shift fork 9 being connected with an engaging hub 11c positioned between said high speed gear 11a and low speed gear 11b, whereby the rotation of said gears 11a and 11b can be selectively transmitted to said counter shaft 10 by the operation of said speed change shift lever 2.

Further, a forward gear 12a and a reverse gear 12b are rotatably mounted on said counter shaft 10 opposite to each other in said forward/reverse selection mechanism 12, said shift fork 8 being connected with an engaging hub 12c positioned between said forward gear 12a and reverse gear 12b, whereby the rotation of said counter shaft 10 can be selectively transmitted to said forward gear 12a and reverse gear 12b by the operation of said forward/reverse shift lever 1.

In the above noted conventional construction, since said shift levers 1 and 2 are directly mounted on said transmission case 5, the vibration which is caused when said transmission case 5 is laterally vibrated by the rolling vibration of the engine is directly transmitted to said shift levers 1 and 2, making it difficult to operate said shift levers 1 and 2.

The present invention aims to minimize the above noted rolling vibration of said transmission case that is transmitted to said shift levers.

SUMMARY OF THE INVENTION

The present invention aims to eliminate the above noted difficulties by providing an improved shift lever mechanism for a transmission in a vehicle.

A further object of the invention is to provide a shift lever mechanism for a transmission in a vehicle which minimizes the rolling vibration of said transmission case that is transmitted to said shift levers.

The above and further objects and novel features of the invention will be more apparent from the following detailed description when read in connection with the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
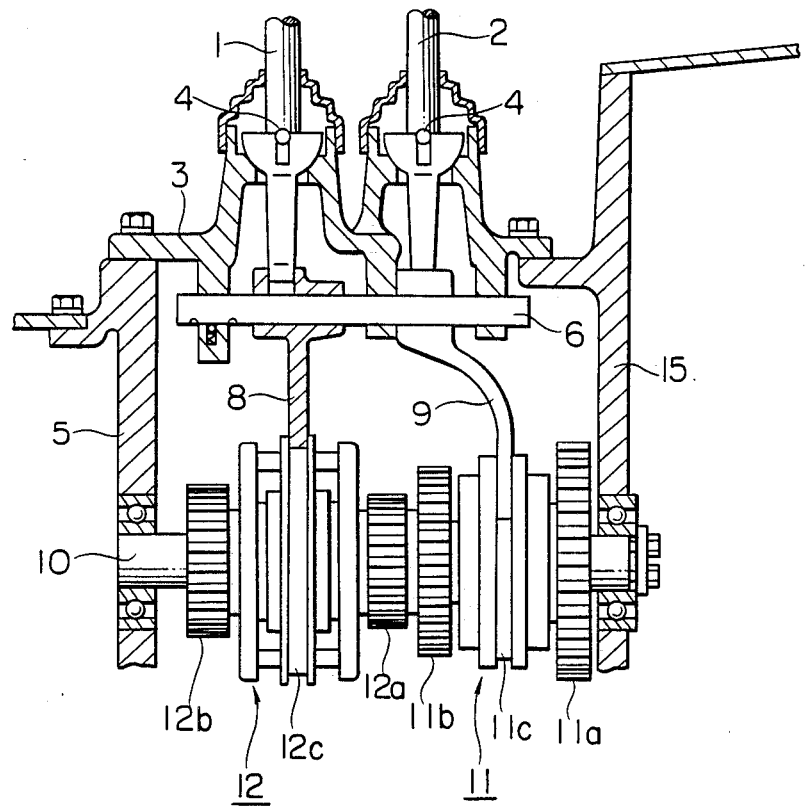
FIG. 1 shows an enlarged cross sectional view of a part of a conventional construction.
Figure 2:
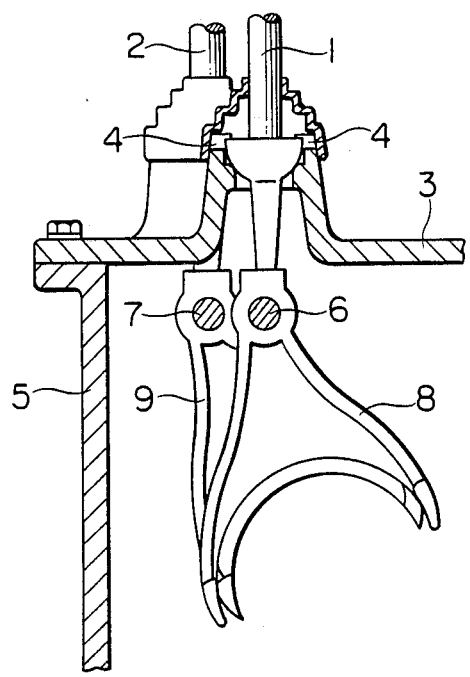
FIG. 2 shows an enlarged front sectional view of a part of the conventional construction shown in FIG. 1.
Figure 3:
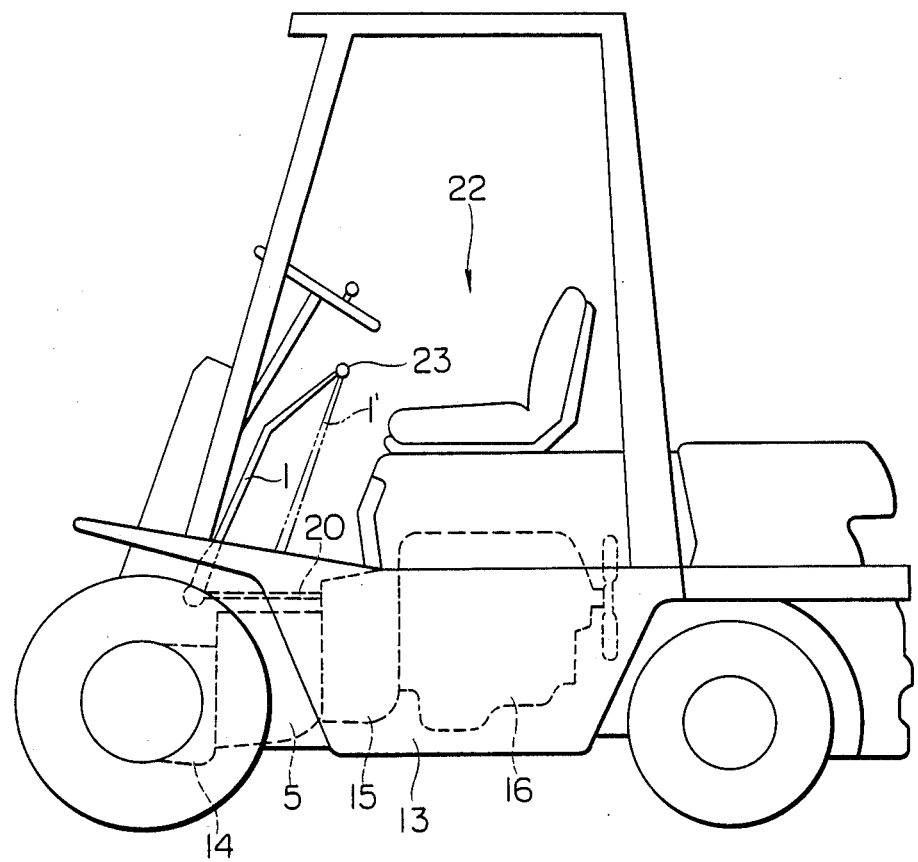
FIG. 3 shows a side view of an industrial vehicle having a shift lever mechanism of the present invention.

Referring now to the preferred embodiment of the present invention and accompanying drawings:

FIG. 3 shows a forklift truck having a shift lever mechanism of the present invention and having a body frame 13 in which a differential case 14, a transmission case 5, a clutch housing 15 and an engine 16 are integrally connected extending from the front portion thereof.

Figure 4:
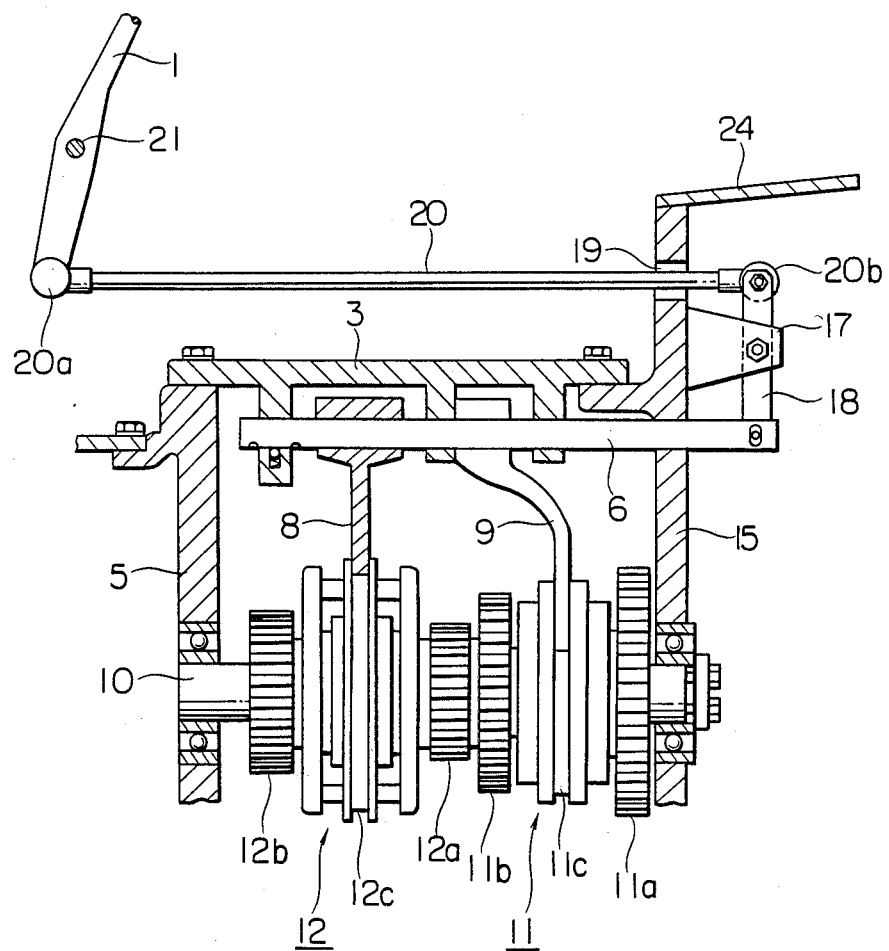
FIG. 4 shows an enlarged cross sectional view of a shift lever mechanism of the present invention.

FIG. 4 shows a detailed mounting construction of a forward/reverse shift lever 1 (referred to simply as shift lever hereinafter) for said transmission case 5.

Numeral 6 shows a forward/reverse forkshaft (referred to simply as a fork shaft hereinafter) which is slidably mounted for movement in both the front and rear directions in said transmission case cover 3 within the transmission case 5, the rear end portion of said fork shaft 6 passing through into said clutch housing 15 after passing through said transmission case 5, and a shift fork 8 is mounted on said fork shaft 6. Numeral 17 shows a bearing member mounted on said clutch housing 15 to which the central portion of an arm member 18 the lower portion of which is connected to said end portion of said fork shaft 6, is rotatably mounted for both forward and rearward movement.

A high and low speed change mechanism 11 and a forward/reverse selection mechanism 12 are slidably mounted on said counter shaft 10 which is supported at both front and rear and extends through said transmission case 5. A high speed gear 11a and low speed gear 11b of said high and low speed change mechanism 11 are rotatably mounted opposite to each other on said counter shaft 10, a shift fork 9 connected with an engaging hub 11c being disposed between said high speed gear 11a and low speed gear 11b, whereby the rotation of said gears 11a and 11b can be selectively transmitted to said counter shaft 10 by the operation of said speed changing shift lever 2.

Further, a forward gear 12a and a reverse gear 12b of said forward/reverse selection mechanism 12 are rotatably mounted on said counter shaft 10 opposite to each other, said shift fork 8 being connected with an engaging hub 12c which is disposed between said forward gear 12a and reverse gear 12b, whereby the rotation of said counter shaft 10 can be selectively transmitted to said gears 12a and 12b by the operation of said shift lever 1.

Further, an upper end portion of said arm member 18 is connected via a ball joint 20b to a rear end of a connecting rod 20 which slidably passes through a hole portion 19 formed in a wall of said clutch housing 15 and which extends into said clutch housing 15. A front end portion of said connecting rod member 20 is connected to a lower end portion of said shift lever 1 via a ball joint 20a and the lower portion thereof is mounted on said body frame 13 to be tiltable both forwards and backwards by a tilting axis 21.

As shown in FIG. 3, the mounting position of said shift lever 1 in a driving compartment 22 is moved forward from the mounting position of a conventional shift lever 1' shown by the dotted line, hence the upper portion of said shift lever 1 is curved towards the rear so as to position a nob 23 of said shift lever 1 towards the driver (not shown).

Figure 5:
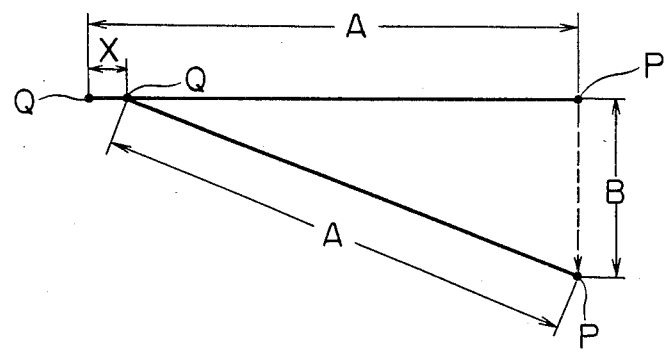
FIG. 5 shows an explanatory line drawing for explaining the operation of the present invention.

Reference is now made to an operation based on the aforementioned construction relating to said shift lever mechanism in a transmission for a vehicle:

When said transmission case 5 and clutch housing 15 are vibrated laterally in said vehicle by the rolling vibration of said engine 16, the point connecting (referred to as point-P hereinafter) said connecting rod member 20 and arm member 18 as shown in FIG. 5 also vibrates laterally in said vehicle. On the other hand, the point connecting (referred to as point Q hereinafter) said connecting rod member 20 and shift lever 1 vibrates longitudinally, both frontwards and backwards, hence said shift lever 1 is supported on said body frame 13 so as to tilt only in both front and rear directions.

In the above noted condition, "A" is the length of said rod member 20, "B" is the lateral vibration distance in the vehicle, "X" is the vibrating distance in the front and rear directions of point Q. The respective relationships of said distance "A", "B" and "X" as shown in FIG. 5 appears as a formula as follows:

$$X = A - \sqrt{A^2 - B^2}$$

However, in this condition as shown in FIG. 5, said length "A" of said rod member 20 is greater than said lateral vibration "B" of said point "P", whereby said vibration distance "X" in the front and rearward direction of point Q becomes remarkably smaller so as to become negligible during actual shift operations of a driver. Therefore, the influence of said rolling vibration of said engine 16 is not transmitted to said shift lever 1.

Further in the shifting operation, where the shift lever 1 is tilted back and forth, the lower end of shift lever 1 is thereby moved back and forth and this movement is transmitted to fork shaft 6 via the linking mechanism of connecting rod member 20 and arm member 18. Shift fork 8 is then moved back and forth so that said shift operation is easily performed.

Figure 6:
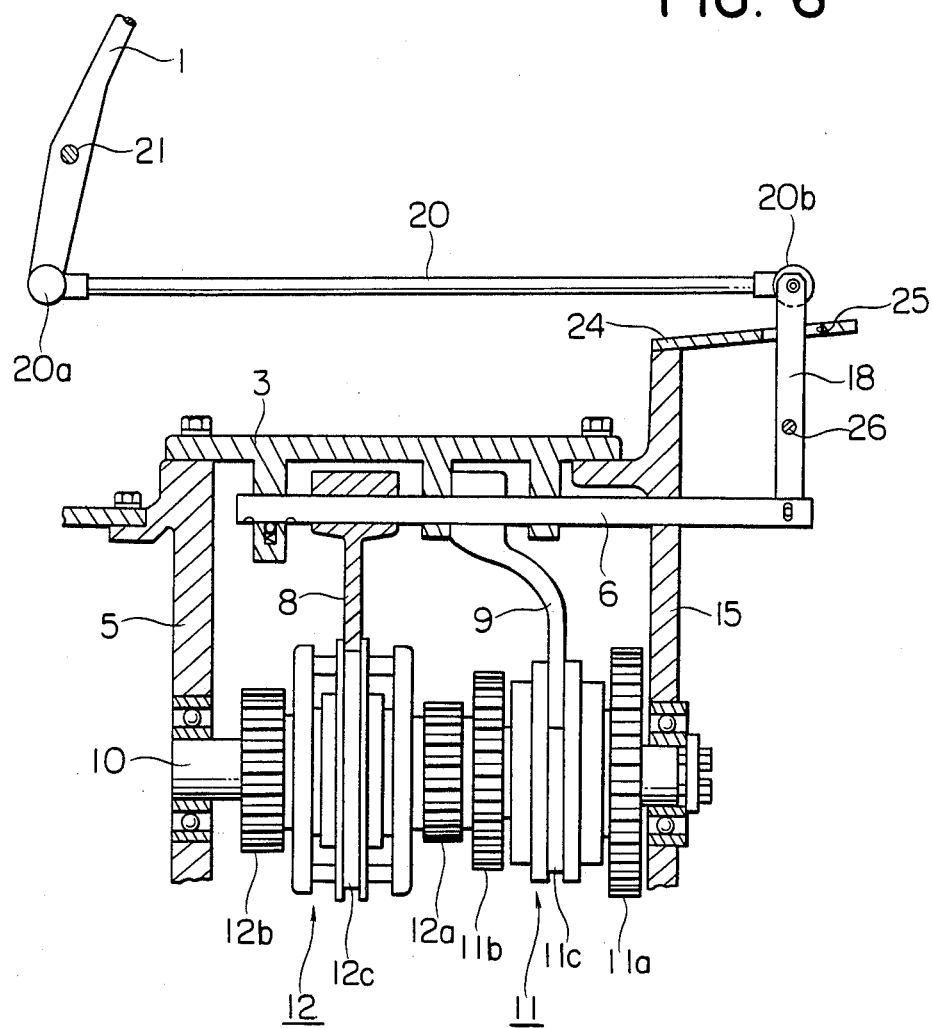
FIG. 6 shows an enlarged cross sectional view of a part of another embodiment of the present invention.

FIG. 6 shows another embodiment of the present invention, wherein a clutch housing cover 24 is mounted on said clutch housing 15. The upper end portion of said arm member 18 passes through a through hole 25 in said cover 24 and may be operated from the outside of said housing 15, and the tilting axis 26 may be mounted on either the right or left side wall of said clutch housing 15. Further, although not shown in the drawings, said arm member 18 can also be supported in a horizontal or inclined condition and the upper end portion of arm member 18 can protrude through a side wall of clutch housing 15 to connect with rod member 20.

Figure 4A:
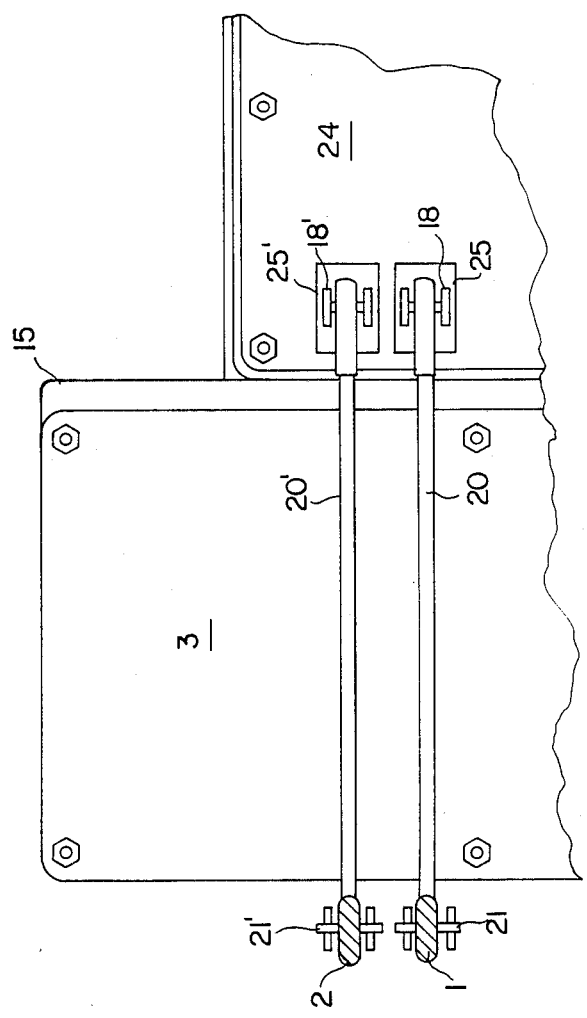
FIG. 4A is a fragmentary top plan view of the mechanism of FIG. 4.

In the above noted embodiments, the present invention was described with reference to the forward-/reverse shift lever 1. However, the operation of the speed change shift lever 2 (FIG. 4A) was not described because it has the same construction including a second shift lever 2 for changing speed, a second fork shaft 7, a second connecting rod member 20' and a second arm member 18' and operation as the above noted embodiments.

Figure 7:
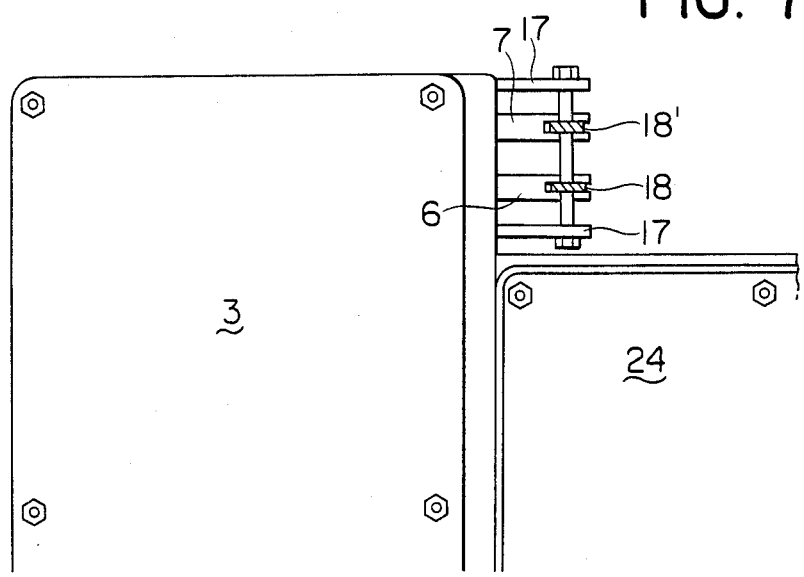
FIG. 7 shows a plan view of still another embodiment of the present invention.

Accordingly, in the above noted embodiments of the present invention, the end portions of said fork shafts pass through into said clutch housing 15, namely, the mounting position of the rearward end of said fork shaft 6, which is normally within said transmission case 5, is now located within the outer periphery of said clutch housing 15. However, as shown in plan view in FIG. 7, the end portions of the respective of said fork shaft 6 for the forward/reverse gear and fork shaft 7 for speed changes pass through the outside of said clutch housing 15 and are connected to arm members 18, 18' on the outside of said clutch housing 15.

In the above noted embodiment of the present invention, said shift lever mechanism for a transmission in a vehicle is applied to an industrial vehicle such as a forklift truck. However the same operation and merits are inherent even in the case of applying said shift lever mechanism for transmissions in cars, trucks and so on.

According to the shift lever mechanism of the present invention, the rolling vibration of the engine is hardly transmitted at all to said shift lever, so accordingly, shifting operation becomes easier than with conventional shift lever mechanisms. Further, one is able to get in and out of the driver's seat easier since the mounting position of the shift lever in relation to the driver's seat is in a more forward direction.

Finally, although an embodiment concerning a clutch mechanism was described, the present invention can be applied to vehicles having an automatic transmission with no clutch.

What we claimed is:

1. A shift lever mechanism for a transmission in a vehicle in which a driving mechanism is comprised of a differential case, a transmission case having opposite ends, a clutch housing, and an engine which are connected respectively in substantially longitudinal alignment, said transmission case having a distance of movement, in the lateral direction of said vehicle, responsive to vibrations during operation, characterized in that a first longitudinally movable fork shaft movably protrudes from one wall portion of said transmission case at one end thereof adjacent to said clutch housing, a first longitudinally movable connecting rod member is pivotally connected via a first pivotable arm to said first fork shaft adjacent to said one end of the transmission case to control the longitudinal movement of the fork shaft, said connecting rod extending substantially parallel to said fork shaft but exterior of said transmission case and towards the other of its said ends, and a first shift lever is pivotably connected to one end portion of said first connecting rod member adjacent to said other end of the transmission case, whereby said first shift lever controls said movement of said first fork shaft via said first connecting rod member, the length of said first connecting rod member being greater than said vibrational distance in the lateral direction of the vehicle.

2. A shift lever mechanism for a transmission in a vehicle as claimed in claim 1, wherein said first pivotable arm is pivotably mounted on an outer portion of said transmission case.

3. A shift lever mechanism for a transmission in a vehicle as claimed in claim 1, further comprising a speed change mechanism mounted in said transmission case and said first fork shaft carries a first shift fork engaging said speed change mechanism for operating the latter responsive to movement of said first shift lever.

4. A shift lever mechanism for a transmission in a vehicle in which a driving mechanism is comprised of a differential case, a transmission case, a clutch housing, and an engine which are connected respectively in substantially longitudinal alignment, said transmission case having a distance of movement, in the lateral direction of said vehicle, responsive to vibrations during operation, characterized in that a first longitudinally movable fork shaft movably protrudes from one wall portion of said transmission case, a first longitudinally movable connecting rod member is connected via a first pivotable arm to said first fork shaft to control the longitudinal movement of the latter, a first shift lever is pivotably connected to one end portion of said first connecting rod member, whereby said first shift lever controls said movement of said first fork shaft via said first connecting rod member, the length of said first connecting rod member being greater than said vibrational distance in the lateral direction of the vehicle, a speed change mechanism mounted in said transmission case, said first fork shaft carrying a first shift fork engaging said speed change mechanism for operating the latter responsive to movement of said first shift lever, a forward/reverse selection mechanism mounted in said transmission case, a second longitudinally movable fork shaft movably protruding from one end portion of said transmission case, a second longitudinally movable connecting rod member connected via a second pivotable arm to said second fork shaft to control the longitudinal movement of the latter, a second shift lever pivotably connected to one end portion of said second connecting rod member, and a second shift fork mounted on said second fork shaft and engaging said forward/reverse selection mechanism for operating the latter responsive to movement of said second shift lever, the length of said second connecting rod member being greater than said vibrational distance in the lateral direction of the vehicle.

5. A shift lever mechanism for a transmission in a vehicle in which a driving mechanism is comprised of a differential case, a transmission case, a clutch housing, and an engine which are connected respectively in substantially longitudinal alignment, said transmission case having a distance of movement, in the lateral direction of said vehicle, responsive to vibrations during operation, characterized in that a first longitudinally movable fork shaft movably protrudes from one wall portion of said transmission case, a first longitudinally movable connecting rod member is connected via a first pivotable arm to said first fork shaft to control the longitudinal movement of the latter, and a first shift lever is pivotally connected to one end portion of said first connecting rod member, whereby said first shift lever controls said movement of said first fork shaft via said first connecting rod member, the length of said first connecting rod member being greater than said vibrational distance in the lateral direction of the vehicle, said first pivotable arm being mounted within said clutch housing, and said rod member protruding out of said clutch housing.

* * * * *